United States Patent [19]

Katayama

[11] Patent Number: 5,613,156
[45] Date of Patent: Mar. 18, 1997

[54] IMAGING SYSTEM WITH 1-N PARALLEL CHANNELS, EACH CHANNEL HAS A PROGRAMMABLE AMPLIFIER AND ADC WITH SERIAL CONTROLLER LINKING AND CONTROLLING THE AMPLIFIERS AND ADCS

[75] Inventor: Andrew S. Katayama, Cardiff-by-the-Sea, Calif.

[73] Assignee: Eastman Kodak Company, Rochester, N.Y.

[21] Appl. No.: 313,486

[22] Filed: Sep. 27, 1994

[51] Int. Cl.$^6$ .................................................. G06T 1/20
[52] U.S. Cl. ................... 395/827; 395/840; 395/841; 364/229; 364/231.9; 364/232.21; 364/920.7; 348/230; 348/272; 348/282; 348/300
[58] Field of Search .................................. 395/840, 841, 395/200.08, 200.21, 827; 364/229, 229.2, 231.9, 232.21; 348/230, 272, 282, 300

[56] References Cited

U.S. PATENT DOCUMENTS

| | | | |
|---|---|---|---|
| 3,764,922 | 10/1973 | Gilbert et al. | 327/307 |
| 3,766,526 | 10/1973 | Buchanan | 395/871 |
| 4,322,752 | 3/1982 | Bixby | 398/212 |
| 4,514,823 | 4/1985 | Mendelson et al. | 395/822 |
| 4,918,589 | 4/1990 | Floro et al. | 369/132 |
| 4,959,773 | 9/1990 | Landers, Jr. | 395/892 |
| 4,979,096 | 12/1990 | Ueda et al. | 395/200.19 |
| 4,999,768 | 3/1991 | Hirokawa | 395/200.07 |
| 5,050,065 | 9/1991 | Dartois et al. | 364/200 |
| 5,065,314 | 11/1991 | Maskovyak | 395/831 |
| 5,131,081 | 7/1992 | MacKenna et al. | 395/842 |
| 5,176,900 | 1/1994 | Schwede | 395/800 |
| 5,274,767 | 12/1993 | Maskovyak | 395/836 |
| 5,303,352 | 4/1994 | Robinson et al. | 395/325 |
| 5,398,315 | 3/1995 | Johnson et al. | 395/163 |
| 5,465,375 | 11/1995 | Thepaut et al. | 395/800 |

*Primary Examiner*—Thomas C. Lee
*Assistant Examiner*—Anderson I. Chen
*Attorney, Agent, or Firm*—William F. Noval

[57] ABSTRACT

An imaging system having an image sensor which is read out as a plurality of parallel image signals. A plurality of parallel image signal processing channels are provided to process said plurality of image signals. Each channel includes a programmable I/O station for receiving, storing, and transmitting data used in controlling the channel. A closed loop serial I/O transmission link serially connects the programmable I/O stations. A controller is connected to the link to control the transmission of data to one or more of said plurality of programmable I/O stations.

2 Claims, 9 Drawing Sheets

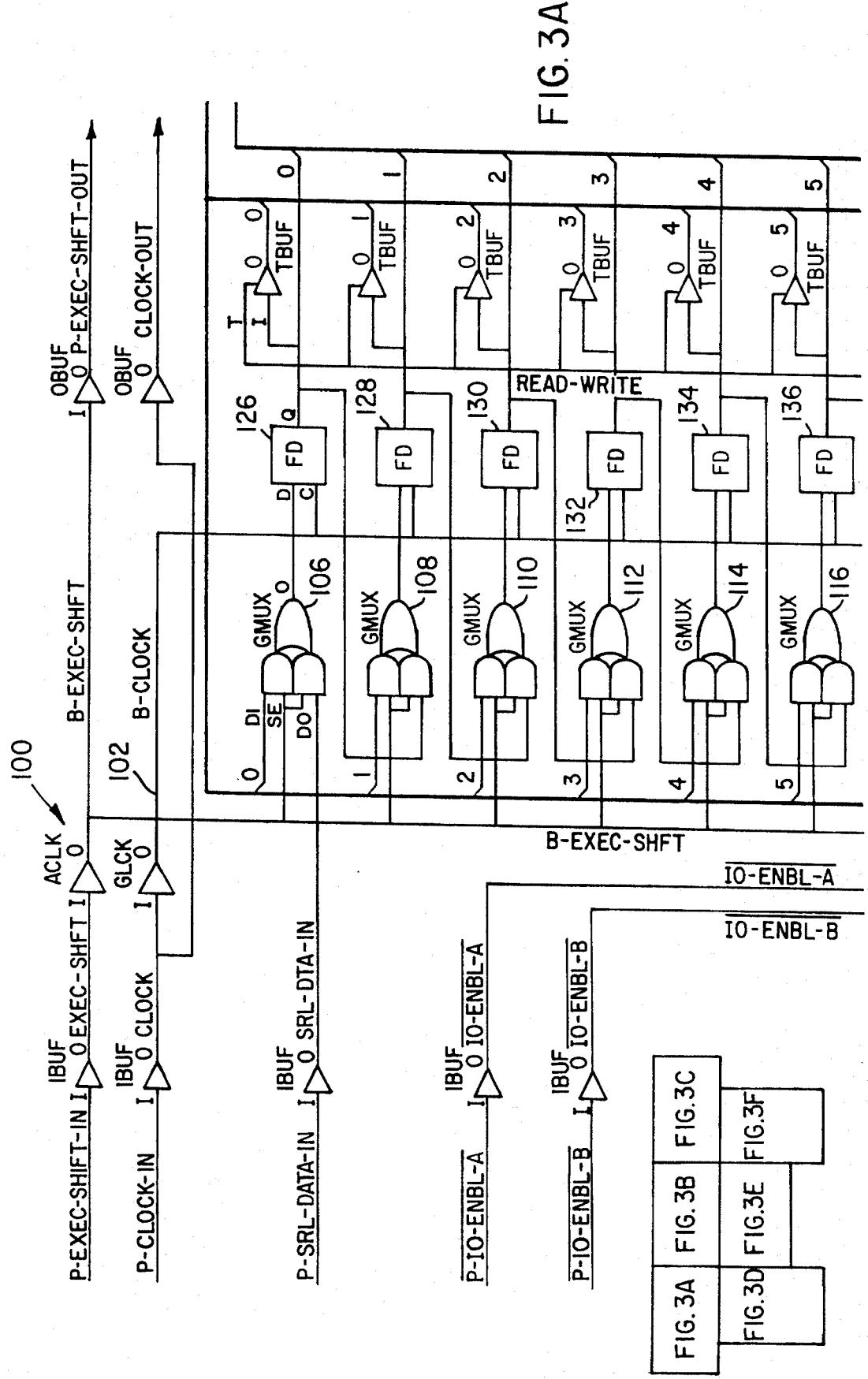

IMAGING SYSTEM WITH 1-N PARALLEL CHANNELS, EACH CHANNEL HAS A PROGRAMMABLE AMPLIFIER AND ADC WITH SERIAL CONTROLLER LINKING AND CONTROLLING THE AMPLIFIERS AND ADCS

FIELD OF THE INVENTION

This invention relates in general to imaging systems having an imager which is read out in multiple parallel channels, and relates, more particularly, to such an imaging system having a serial I/O (Input/Output) link between image channels.

BACKGROUND OF THE INVENTION

High frame rate and high resolution video cameras use high data rates to effect proper operation. In order to minimize channel bandwidth and data rate, it has been proposed to use a multichannel sensor array, such as disclosed in U.S. Pat. No. 4,322,752, issued Mar. 30, 1982, inventor Bixby. Typically, each channel is provided with amplifier and other signal processing circuitry. Where the image from the sensor is to be stored in digital memory, each video channel is provided with an analog-to-digital converter. One of the difficulties to be dealt with in using a multichannel sensor is the requirement that the transfer characteristic, relating output signal amplitude to sensor illumination, be uniform across all channels. Even minor nonuniformities can be readily detected as banding by the human eye, when the image is displayed on a video display. Thus, each video channel must be adjustable to calibrate it for optimum signal characteristics. It is advantageous that the control for such adjustments be efficient, cost effective and noncomplex.

Serial data and control communication, as opposed to parallel data and control communication, can effect such advantageous communication. However, known serial communication techniques as disclosed in the following patents, do not address the problems of a multichannel image sensor imaging system.

U.S. Pat. No. 4,918,589, issued Apr. 17, 1990, discloses a method and apparatus for linking processing in a hierarchical control system. The disclosed system is highly complex, expensive, and not readily adaptable to the requirements of a multichannel imaging system.

U.S. Pat. No. 4,959,773, issued Sep. 25, 1990, inventor Landers, discloses an adapter for attaching I/O devices to I/O communications with alternating read and write modes link. Only a single channel is linked between an MPU RAM and a Display RAM. Multi channel links are not used.

U.S. Pat. No. 4,999,768, issued Mar. 12, 1991, inventor Hirokawa, discloses data transfer control units each of which comprises processors and dual-port memory. There is no disclosure of a serial link between the signal channels of a multichannel imaging system.

U.S. Pat. No. 4,514,823, issued Apr. 30, 1985, inventors Mendelson et al., discloses apparatus and method for extending a parallel channel to a serial device. There is no disclosure in this patent of a serial link between the signal channels of a multichannel imaging system.

There is thus a problem in imaging systems having multichannel image signal readout, to provide a communication link to control the multiple channels. Such a link should be simple to implement, allow for easy and unlimited expansion, allow other actions at an input station other than exchanging data to and from the station, and eliminate the need for a processor at the receiving station.

SUMMARY OF THE INVENTION

According to the present invention, there is provided a solution to these problems of the prior art. The present invention has the following advantages.

1. A serial I/O loop allows easy daisy-chained ring hookup.
2. The serial I/O loop is infinitely expandable.
3. As each receiving station in the I/O loop is actually implemented in a programmable part, the I/O loop is not restricted to only exchanging data to/from a receiving station, but can be used to perform specific hardware actions, such as the generation of timing sequences.
4. Each receiving station can be customized to the station's needs, while still maintaining inter-operability with other stations on the loop.
5. A receiving station need not be "smart", i.e., equipped with a processor.
6. Although the serial I/O interface of the present invention communicates in a serial fashion, an arbitrary combination of receiving stations on the I/O loop can be programmed to execute their functions in parallel.

According to a feature of the present invention, there is provided in an imaging system having an image sensor which is read out as a plurality of parallel image signals, apparatus comprising:

a plurality of parallel image signal processing channels for processing said plurality of image signals, wherein each of said channels includes at least one programmable I/O (Input/Output) station for receiving, storing and transmitting data used in controlling said channel;

a closed loop serial I/O transmission link serially connecting said programmable I/O stations; and a controller connected to said serial I/O transmission link for controlling the serial transmission of data along said transmission link to one or more of said plurality of programmable I/O stations.

DETAILED DESCRIPTION OF THE PREFERRED EMBODIMENTS

Although the detailed description of a preferred embodiment of the present invention will relate to a multichannel high frame rate or high resolution imaging system, it will be understood that the present invention may also be used in other imaging and data systems.

Figure 1:
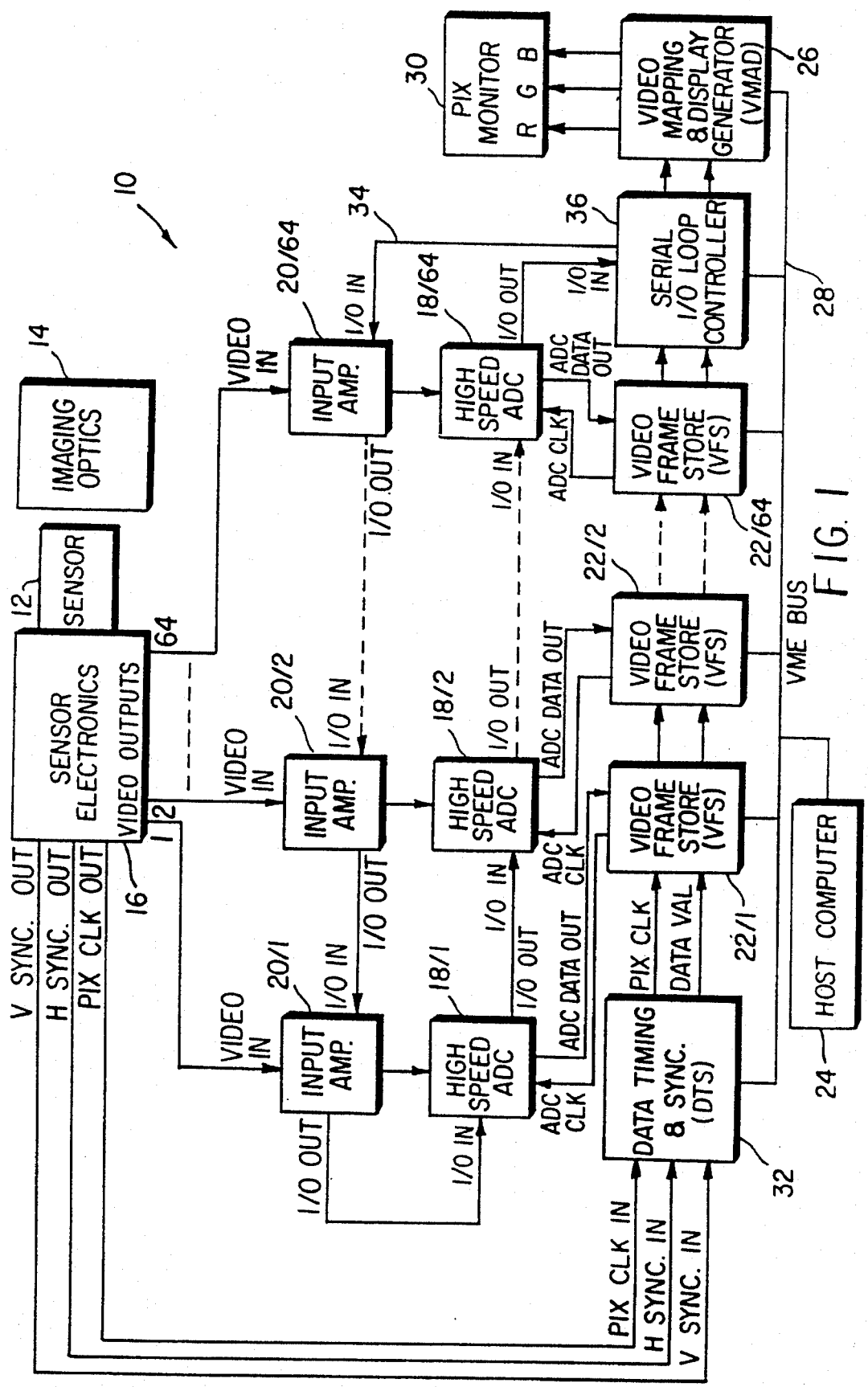
FIG. 1 is a block diagram of an imaging system incorporating an embodiment of the present invention.

A block diagram of a multichannel imaging system is shown in FIG. 1. As shown, imaging system 10 has a sensor 12 which provides, for example, 64 or more video output channels. It will be understood that any number of channels may be provided. Sensor 12 senses a scene by means of imaging optics 14. Sensor 12 is controlled by electronics 16. An exemplary sensor 12 and sensor electronics 16 are described in Bixby U.S. Pat. No. 4,322,752. In general, such a sensor has a matrix of pixels which are read out in parallel in a plurality of rows, columns, or other subsets of pixels. The output from sensor 12 are parallel video signals applied to parallel image processing channels. In the example shown, there are 64 channels.

Each image processing channel includes an input amplifier and an analog-to-digital converter. The video signal in each channel is digitized by a high speed Analog-to-Digital Converter (ADC), such as ADCs 18/1, -----, 18/64, after amplification in video amplifiers 20/1, ----, 20/64. A large number of video frames can be captured by a high speed, video frame store (VFS), e.g., VFSs 22/1, ---, 22/64, for subsequent playback and/or analysis. Video data can be accessed by either the host computer 24, or the dedicated video mapping and display system (VMAD) 26, via the system's VME bus 28. Video images are displayed on monitor 30.

Sensor electronics circuit 16 provides V sync, H sync, and pixel clock signals to data timing and sync circuit (DTS) 26, for controlling VFSs 22/1-22/64.

Individual channel gain and offset is modified by control data from the host computer via a serial, input/output (I/O) loop 34 which is controlled by controller 36. Fine gain and offset are controlled in the ADCs 18/1-18/64. Coarse gain and offset are controlled in the video amplifiers 20/1-20/64.

During a calibration procedure, the offset of each channel is adjusted in the absence of illumination of sensor 12 in order to achieve a desired output black level. Similarly, the gain for each channel is adjusted under a condition of uniform illumination of sensor 12 to achieve a desired average gray level. During the calibration procedure, host computer 24 determines the offset and gain values to be applied in each channel by the above procedures. The average channel output level is estimated and the channel gain and/or offset are modified to achieve a target value for average channel output. Individual channel gain and offset settings are saved, for example, in host computer 24 for subsequent use between calibration.

Figure 2:
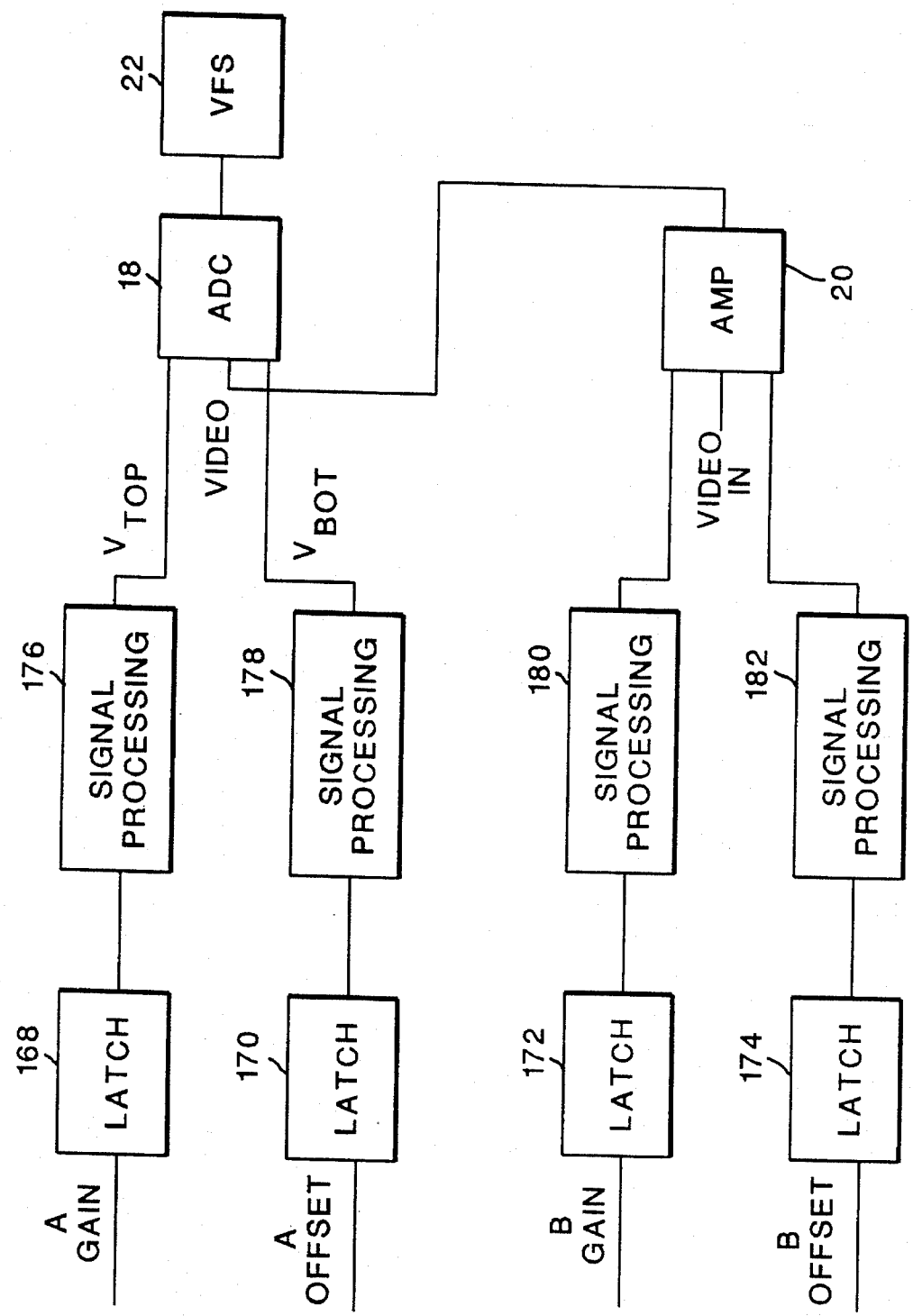
FIG. 2 is a block diagram of components of the imaging system of FIG. 1.
Figure 3B:
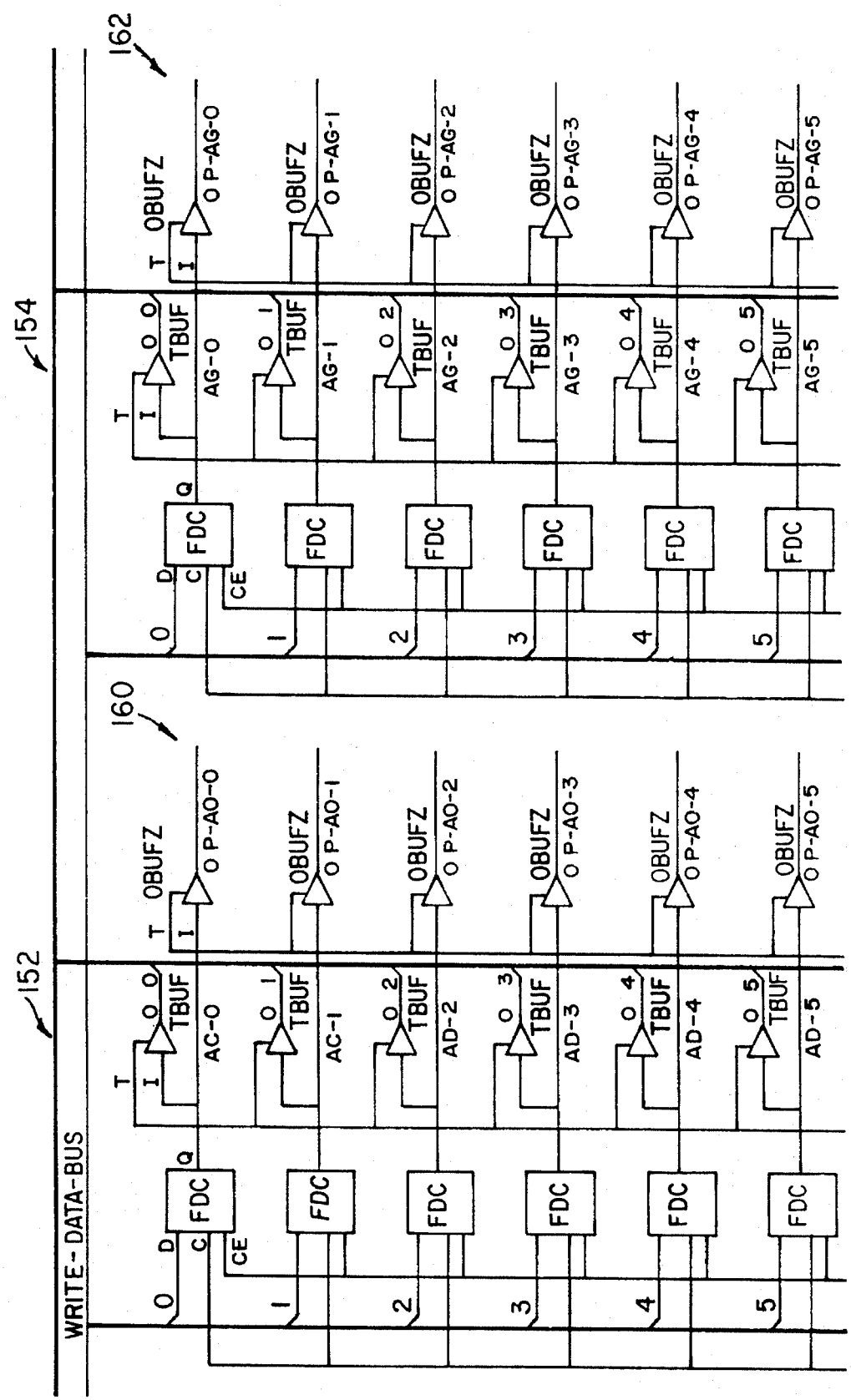
FIG. 3 is schematic diagram of a receiving station useful in implementing the present invention.
Figure 3C:
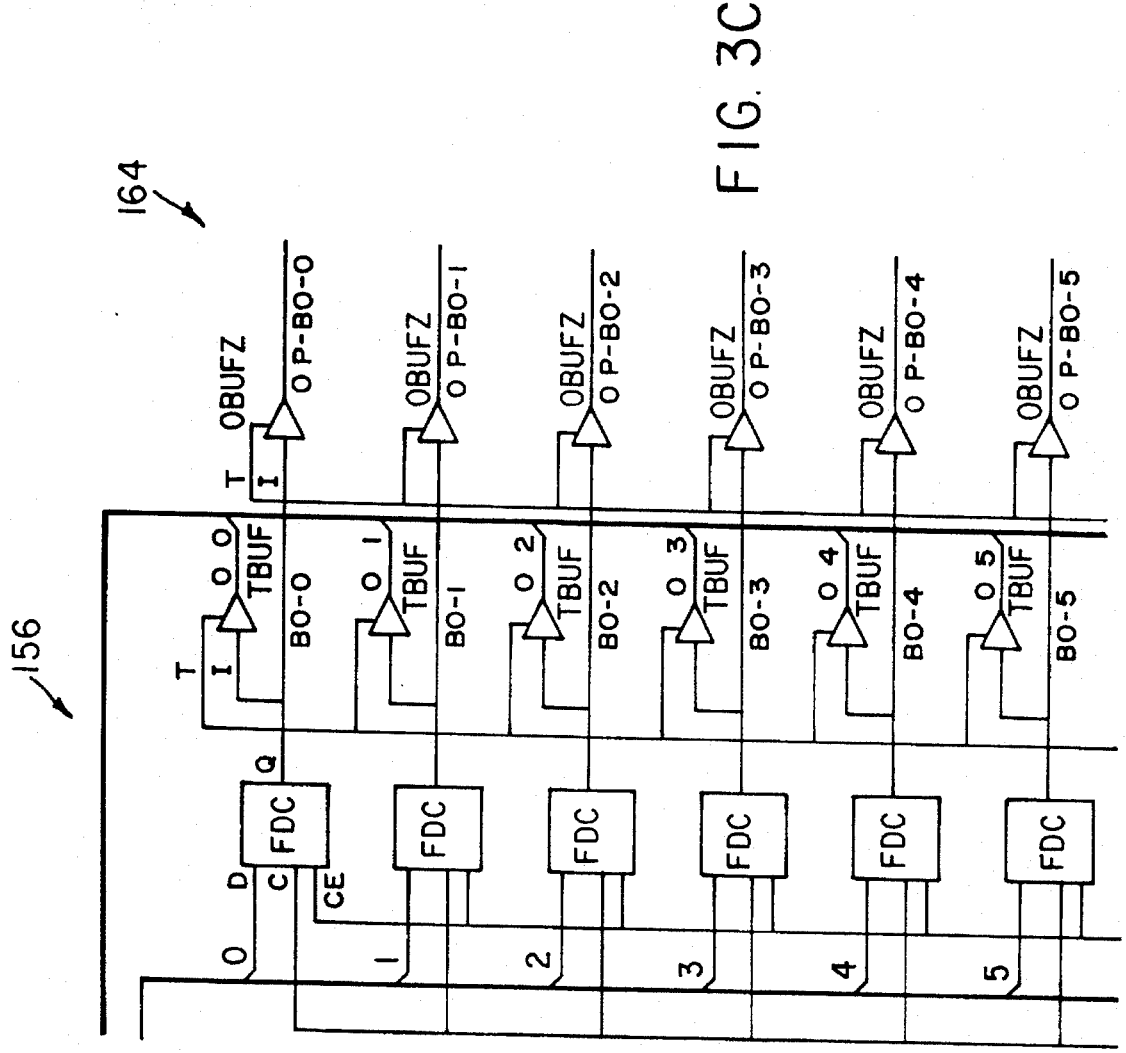
Figure 3D:
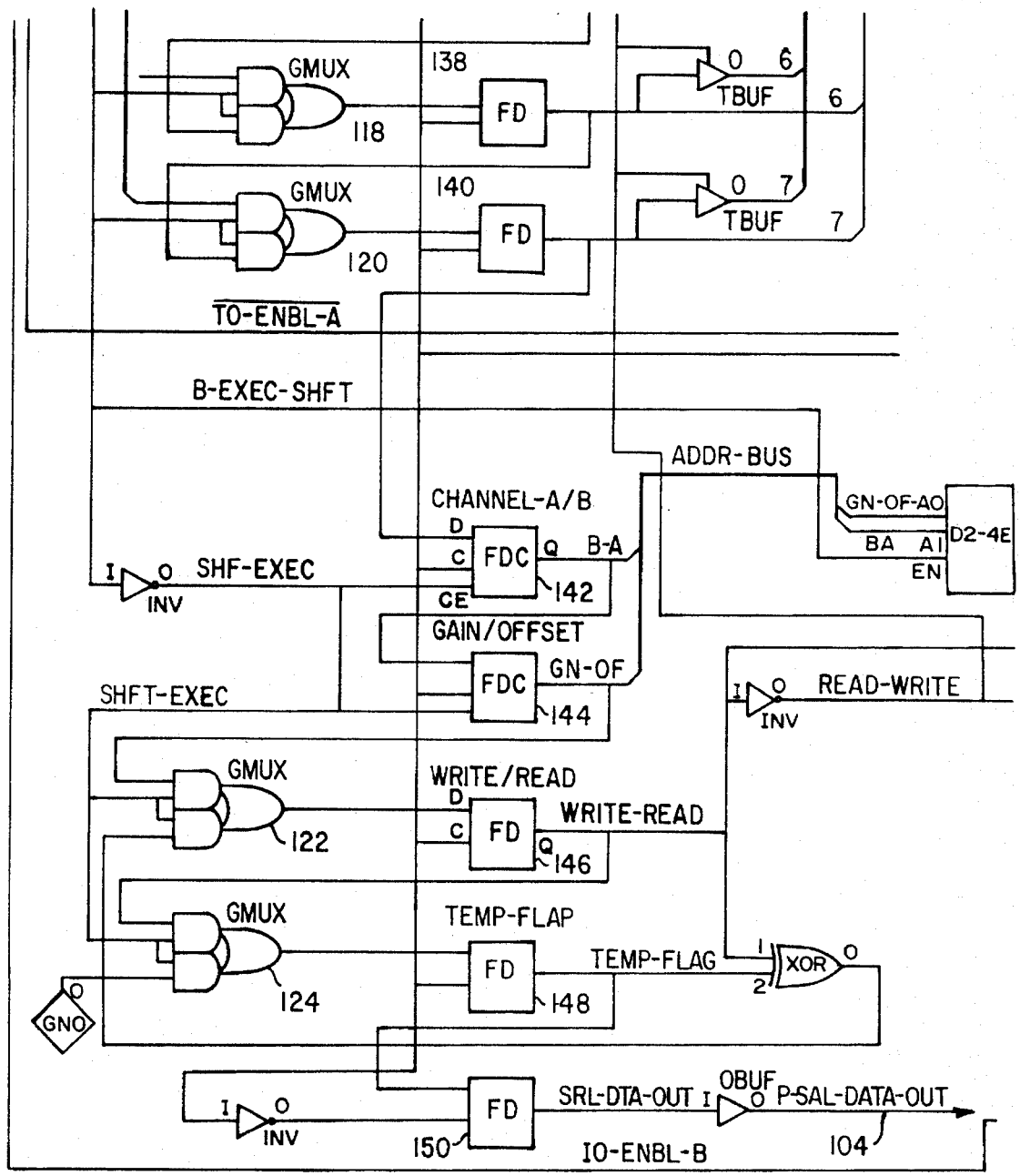
Figure 3E:
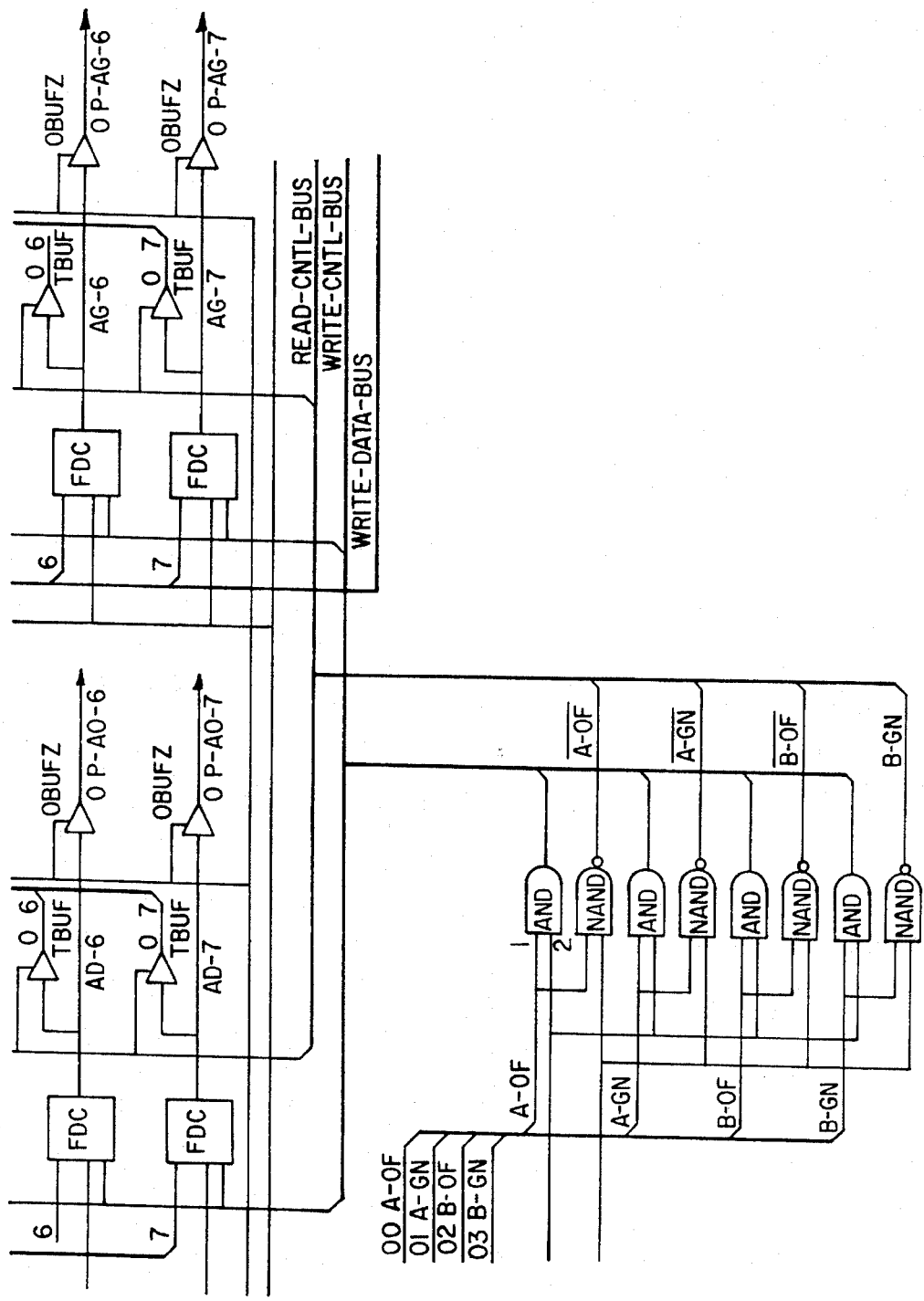
Figure 3F:
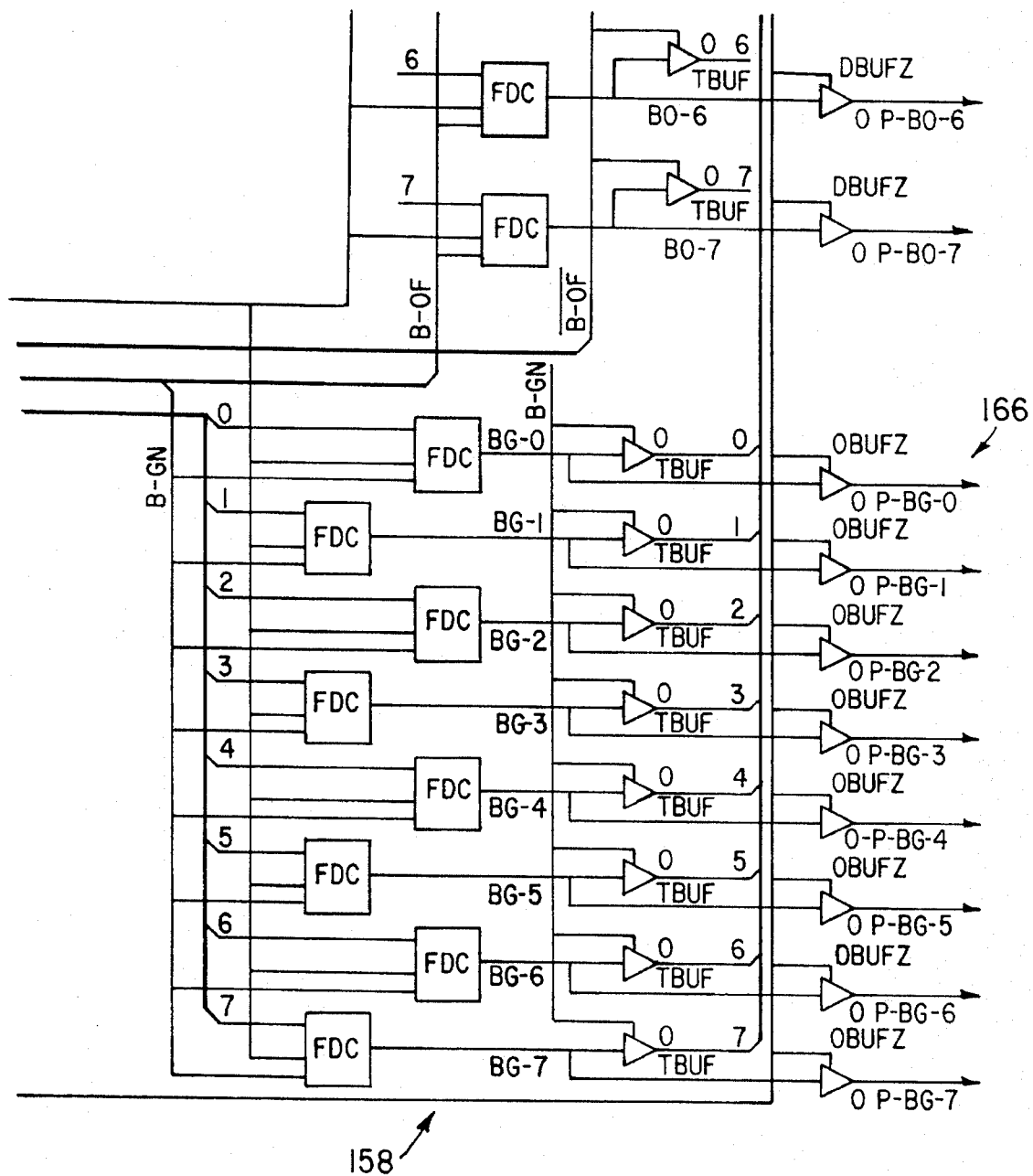

Referring now to FIGS. 2 and 3, there will be described in greater detail, an embodiment of serial I/O link according to the present invention. The serial I/O link is built upon three logical signals (each of which is represented electrically by a differential ECL signal). These signals are the Shift/Exec signal transmitted on line 100, the Clock signal transmitted on line 102, and the Serial Data transmitted on line 104. Local board enable signals are transmitted on lines 101, 103. A ribbon cable can be used to transmit these signals between several stations. Each station acts as a repeater, whose outputs transmit the signal to the next station. The last station must send its outputs to controller 36.

As shown in FIG. 3, a station on the serial I/O loop includes the following components, for example, multiplexers 106–124, bit shift registers 126–150, byte latches 152–158, and output terminals 160–166. The serial I/O is driven by the clock signal on line 102 and the state of the Shift/Exec signal on line 100. Whenever a positive clock edge occurs when the Shift/Exec signal is asserted, data on line 104 is shifted into the internal shift register 126–150, by way of multiplexers 106–124, of each station. The data line 104' out of each station is updated on the falling edge of the Clock signal, regardless of the state of the Shift/Exec line 100. Whenever the Shift/Exec line 100 is deasserted on a rising clock edge, a command is executed at each station depending on the command bits shifted into the station. As the Clock and the Shift/Exec lines 102,100 are merely buffered before being passed onto the next station, a command cycle is executed in parallel on all stations.

Internal to each station is 12–½ bit shift register 126–150. (The ½ bit represents the last stage of the shift register, which operates on the negative clock edge.) The first eight bit SRs 126–140 hold the data portion of a command. These data include a byte, e.g., of fine gain, fine offset, coarse gain, coarse offset. The next four bits contain addressing and command information. The twelve bits are: bits 0–7——data; bit 8—A/B select; bit 9—gain/offset select; bit 10—write/read select; bit 11—temp flag. Bits 8–11 are stored in SRs 142–148, respectively. Each station in the serial I/O loop has four ports, divided into the gain and offset ports of two channels A and B. Thus, bits 8 and 9 address one of these ports through decoder 151. The ports are represented by A gain latch 152 and output terminal 160, A offset latch 154 and output terminal 162, B gain latch 156 and output terminal 164, B offset latch 158 and output terminal 166. Bit 10 denotes whether a read or write operation should be done of that port. Bits 0–7 carry the data to be written to the port for a write operation, or the data read from the port after a read operation. FIG. 3 only shows the connections for a write operation. (Note that data bits 0–7 do not change as a result of a write operation.)

The Temp Flag only gets used during command execution. Whenever a command is executed with the Temp Flag set, the operation is carried out as usual, but upon completion, a Write command will be written back to the shift register as a Read command and vice-versa. In addition, the Temp Flag will be cleared.

As shown in FIG. 2, the A gain and A offset data are latched into latches 168 and 170. These data represent fine gain and fine adjustment which are applied to the top and bottom voltages of ADC 18. ADC 18 is preferably a flash ADC in which conversion gain is proportional to the potential difference between the top and bottom voltages of the ADC and conversion offset is proportional to the bottom ladder potential. As shown, the data latched in latch 168 is processed by signal processing circuit 176 and applied to modify V top of ADC 18. The data latched in latch 170 is processed by signal processing circuit 178 and applied to modify V bottom of ADC 18. B gain and B offset data are latched into latches 172 and 174, respectively, and represent coarse gain and coarse offset adjustments to the video amplifier circuit 20 by way of signal processing circuits 180 and 182.

Figure 4:
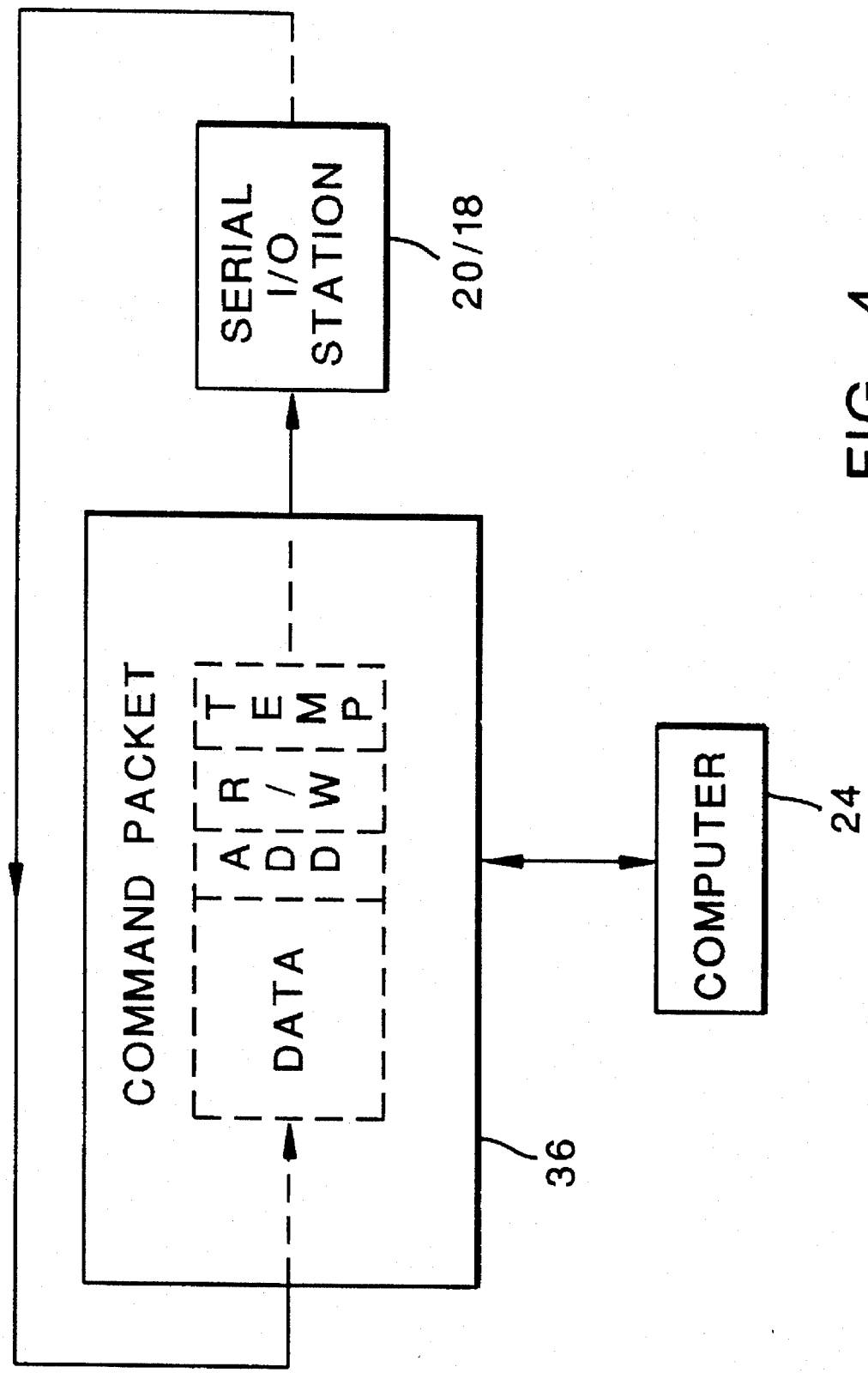
FIG. 4 is a block diagram of a controller station useful in implementing the present invention.

The serial I/O loop controller 36 receives a command packet from computer 24 and transmits it along the serial loop. As depicted in FIG. 4, the command packet includes data bits, address bits, command bits, and a temp flag bit.

The serial I/O loop of the present invention can be used in several modes, including the following.

1. Determining the number of stations hooked up in the I/O loop can be done in two ways. The first method can be used after a power-up condition. The Serial I/O loop is constructed such that after every power-up, all of the internal shift registers at each station is cleared. Thus, one simply shifts out a non-zero stream of data. By shifting out one station at a time and immediately reading back the data at the controller, one can detect the non-zero condition, thereby determining the total number of stations.

The other method simply writes a zero (or some other convenient value) into the controller, then executing a shift of one station. One simply repeats this procedure until one is certain that the total number stations is less than the number of iterations. At this point, one can guarantee the contents of all of the stations. One can then continue as above, by writing a different value to the controller, shifting it by one station, and then reading the data arriving at the controller. By counting the number of subsequent shifts, one can determine the number of stations in the system.

2. Copying data from one station to any downstream station is effected utilizing the Temp Flag feature. One simply shifts out the station whose data should be copied a Temp Read operation of the desired register. When executed at the source station, the data would be read into the Data portion of the internal shift register, while the command itself will be translated into a permanent write command. Thus, by the appropriate number of subsequent shifts followed by an Execute cycle, one can now execute a Write command at any one of the downstream stations. Copying to an upstream station is carried out by passing it through the controller station. After the operation is done, this command should be shifted into the controller and changed to a read command.

3. Reading and writing data from and to all stations on the serial loop is accomplished by writing and shifting out several permanent read/temp write commands before an execute cycle is performed. Initially, write the desired operation for the last station first, then shift it out by one station. Follow by subsequent writes and shifts for earlier stations, until the command for the first channel is written and shifted out. At this time, the desired commands are ready to be executed, as they are present in the internal shift registers of each station. At this time, an Execute operation is performed. For those stations that read out data, one just simply shifts in their data packet back into the serial controller where it can be read. The invention has been described in detail herein with reference to the figures, however, it will be appreciated that variations and modifications are possible within the spirit and scope of the invention.

What is claimed is:

1. An imaging system comprising:

an image sensor which is read out in 1 to n parallel analog image signals; 1 to n programmable amplifiers for respectively amplifying said 1 to n parallel analog image signals, such that each said amplifier amplifies only one of said image signals to the exclusion of any of said other image signals;

1 to n programmable analog-to-digital converters(ADCs) for respectively converting the amplified image signal from said amplifier to a digital signal, such that each said analog-to-digital converters converts only one of said amplified image signals to the exclusion of any of said other image signals;

a controller; and a closed loop serial I/O transmission link which includes an amplifier leg which is linked at one end to said controller, and which links all of said amplifiers serially together, and which further includes an ADC leg which is linked at one end to said controller and which links all of said ADCs serially together, the other ends of said legs being linked together;

wherein said controller controls said 1 to n programmable amplifiers and said 1 to n programmable ADCs by selectively transmitting control signals by said closed loop serial I/O transmission link, said control signals being separate from and not commingled with said image signals.

2. The system of claim 1 wherein said control signals transmitted over said closed loop serial I/O transmission link are coarse gain and coarse offset control signals for controlling said 1 to n amplifiers and fine gain and fine offset control signals for controlling said 1 to n ADCs.

* * * * *